(12) United States Patent
Yamaguchi (10) Patent No.: US 12,288,949 B2
(45) Date of Patent: Apr. 29, 2025

(54) CONNECTOR

(71) Applicant: JAPAN AVIATION ELECTRONICS INDUSTRY, LIMITED, Tokyo (JP)

(72) Inventor: Takahiro Yamaguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 335 days.

(21) Appl. No.: 17/744,047

(22) Filed: May 13, 2022

(65) Prior Publication Data
US 2022/0416486 A1 Dec. 29, 2022

(30) Foreign Application Priority Data
Jun. 28, 2021 (JP) .................................. 2021-106643

(51) Int. Cl.
*H01R 24/64* (2011.01)
*H01R 13/504* (2006.01)

(52) U.S. Cl.
CPC ........... *H01R 24/64* (2013.01); *H01R 13/504* (2013.01)

(58) Field of Classification Search
CPC .. H01R 13/618; H01R 13/504; H01R 13/405; H01R 12/53; H01R 24/64; H01R 24/60; H01R 2107/00
See application file for complete search history.

(56) References Cited

U.S. PATENT DOCUMENTS

| 7,018,236 | B2 | 3/2006 | Nishio et al. |
| 9,991,640 | B2 * | 6/2018 | Tziviskos ............... H01R 24/64 |
| 10,348,032 | B2 | 7/2019 | Yamaguchi et al. |

(Continued)

FOREIGN PATENT DOCUMENTS

| CN | 110112630 A | * | 8/2019 | ............ H01R 43/16 |
| CN | 110112630 B | | 10/2020 |

(Continued)

OTHER PUBLICATIONS

Taiwanese Office Action (and an English language translation thereof) dated Jan. 10, 2023, issued in counterpart Taiwanese Application No. 111119067.

(Continued)

*Primary Examiner* — Ross N Gushi
*Assistant Examiner* — Carlos E Lopez-Pagan
(74) *Attorney, Agent, or Firm* — Holtz, Holtz & Volek PC (57) ABSTRACT

A connector comprises an inner structure and an outer molded body. The inner structure comprises an inner molded body, a fit portion and a projecting portion. The fit portion projects forward from the inner molded body and is mated with a mating fit portion of a mating connector when the connector is connected to the mating connector. The projecting portion projects from the fit portion or the inner molded body. At least a part of the projecting portion is located outward of the fit portion in the upper-lower direction. The outer molded body has a rear portion and a front portion. The rear portion covers the inner molded body in a perpendicular plane perpendicular to the front-rear direction. The front portion extends forward from the rear portion and partially covers the fit portion in the perpendicular plane. The projecting portion is, at least in part, embedded in the front portion.

7 Claims, 8 Drawing Sheets

(56) References Cited

U.S. PATENT DOCUMENTS

| | | | | |
|---|---|---|---|---|
| 2015/0270659 A1* | 9/2015 | Kao | ............... | H01R 13/2442 |
| | | | | 439/607.01 |
| 2016/0315431 A1* | 10/2016 | Tsai | ............... | H01R 24/62 |
| 2017/0054256 A1* | 2/2017 | Yokoyama | ............... | H01R 13/6583 |
| 2017/0093088 A1* | 3/2017 | Tanaka | ............... | H01R 13/6215 |
| 2018/0138643 A1* | 5/2018 | Huang | ............... | H01R 13/5213 |
| 2018/0261956 A1* | 9/2018 | Yamaguchi | ............... | H01R 12/53 |

FOREIGN PATENT DOCUMENTS

| | | | | |
|---|---|---|---|---|
| EP | 3156910 A1 * | 4/2017 | ............... | G06F 13/409 |
| JP | S6218975 U | 2/1987 | | |
| JP | 2005158358 A | 6/2005 | | |
| JP | 2018152244 A | 9/2018 | | |

OTHER PUBLICATIONS

Japanese Office Action (and an English language translation thereof) dated Dec. 25, 2024, issued in counterpart Japanese Application No. 2021-106643.

* cited by examiner

CONNECTOR

CROSS REFERENCE TO RELATED APPLICATIONS

This application is based on and claims priority under 35 U.S.C. § 119 to Japanese Patent Application No. JP 2021-106643 filed Jun. 28, 2021, the content of which is incorporated herein in its entirety by reference.

BACKGROUND OF THE INVENTION

This invention relates to a connector comprising an inner structure and an outer molded body which is molded to cover the inner structure.

For example, this type of connector is disclosed in JPA 2018-152244 (Patent Document 1), the content of which is incorporated herein by reference.

Figure 15:
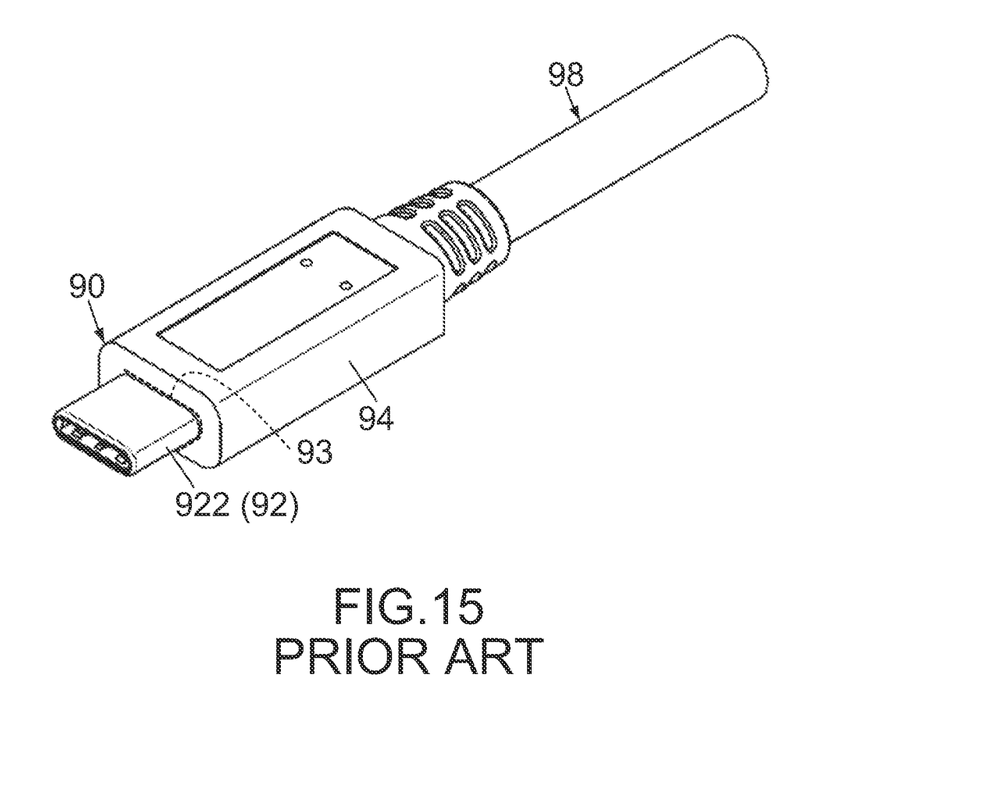
FIG. 15 is a perspective view showing a connector of Patent Document 1 together with a cable.

Referring to FIG. 15, Patent Document 1 discloses a connector 90 comprising an inner structure 92 and an outer molded body 94. The inner structure 92 is connected to a cable 98. The inner structure 92 comprises a fit portion 922. The outer molded body 94 is molded to cover a part of the cable 98 and the inner structure 92 excluding the fit portion 922. The fit portion 922 projects from the outer molded body 94.

When the connector 90 of Patent Document 1 is manufactured, a gap is sometimes formed at a boundary 93 which is located between the fit portion 922 and the outer molded body 94. The gap not only spoils appearance of the connector 90 but also might cause damage of the connector 90.

SUMMARY OF THE INVENTION

It is therefore an object of the present invention to provide a connector which is configured so that a boundary located between a fit portion and an outer molded body is not formed with a gap.

An aspect of the present invention provides a connector connectable to a mating connector along a front-rear direction, the mating connector having a mating fit portion. The connector comprises an inner structure and an outer molded body. The inner structure comprises an inner molded body, a fit portion and a projecting portion. The fit portion projects forward from the inner molded body and is mated with the mating fit portion when the connector is connected to the mating connector. The projecting portion projects from the fit portion or the inner molded body. At least a part of the projecting portion is located outward of the fit portion in an upper-lower direction perpendicular to the front-rear direction. The outer molded body has a rear portion and a front portion. The rear portion covers the inner molded body in a perpendicular plane perpendicular to the front-rear direction. The front portion extends forward from the rear portion and partially covers the fit portion in the perpendicular plane. The projecting portion is, at least in part, embedded in the front portion.

The projecting portion of the inner structure of the aforementioned aspect of the present invention is embedded in the outer molded body. As can be seen from this structure, the outer molded body of the aforementioned aspect of the present invention is molded to cover the inner structure. More specifically, the outer molded body is formed by cooling and hardening liquid resin put in a die. According to an existing technique, when the resin is cooled, a boundary located between the fit portion and the outer molded body tends to be formed with a gap. However, according to a study of the inventor of the present invention, the projecting portion embedded in a front side of the resin can reduce the formation of the gap. Thus, the aforementioned aspect of the present invention provides a connector which is configured so that a boundary located between a fit portion and an outer molded body is not formed with a gap.

An appreciation of the objectives of the present invention and a more complete understanding of its structure may be had by studying the following description of the preferred embodiment and by referring to the accompanying drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
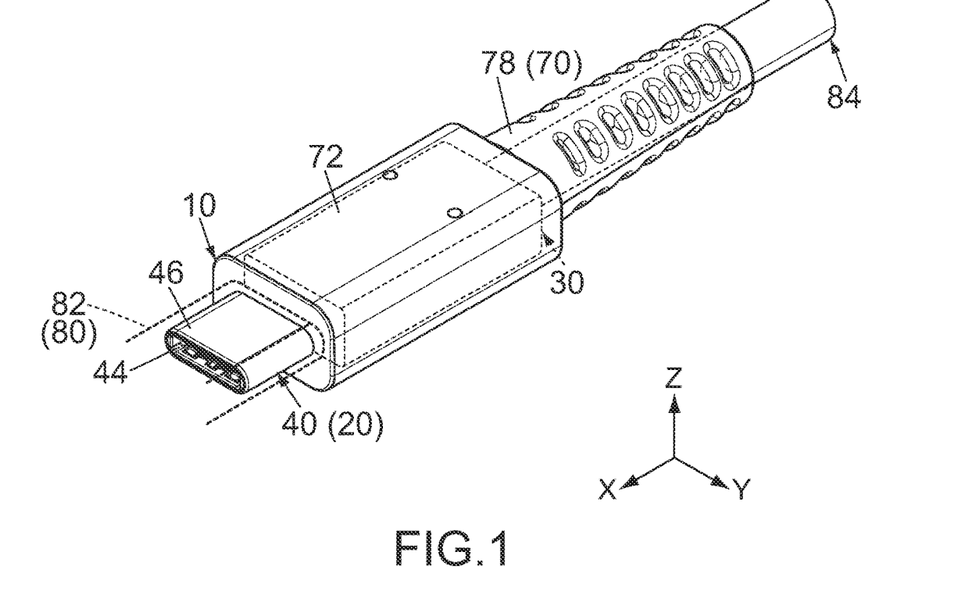
FIG. 1 is a perspective view showing a connector according to an embodiment of the present invention, wherein the connector is connected to a cable, an outline of a mating fit portion of a mating connector, an outline of a hidden inner molded body and an outline of a hidden part of a cable are illustrated with dashed line.
Figure 4:
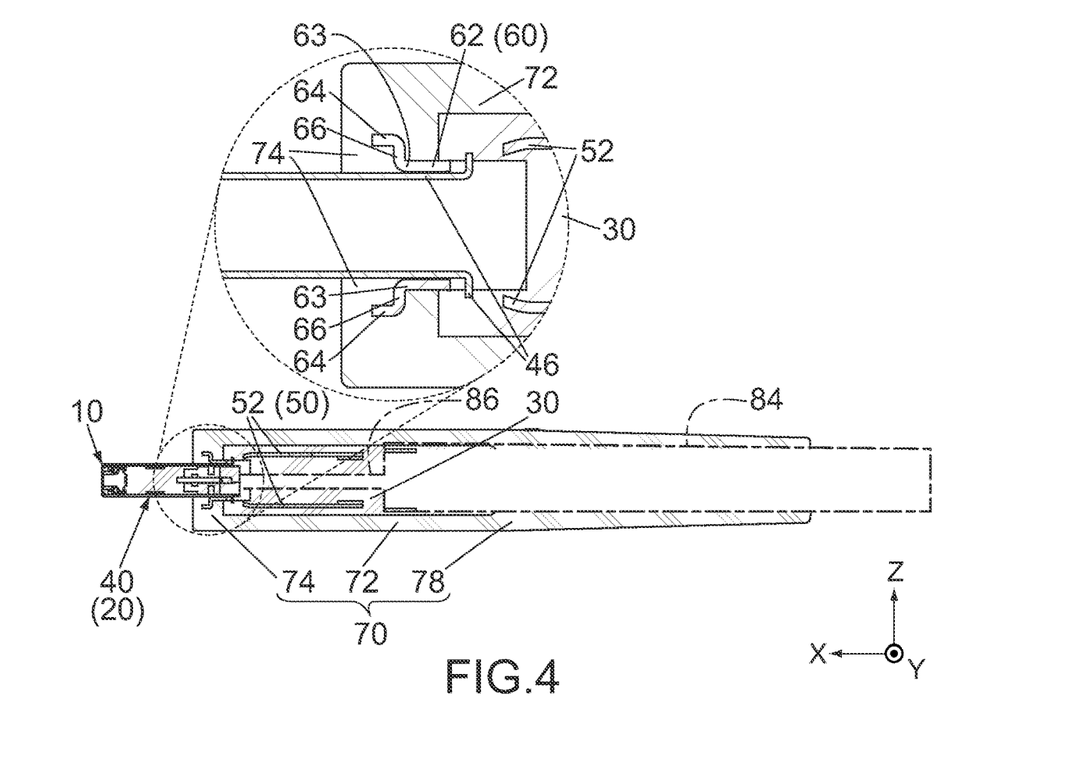
FIG. 4 is a rough, cross-sectional view showing the connector of FIG. 3, taken along line IV-IV, wherein a cross-section of the fit portion is schematically illustrated except for a shell, an outline of the cable is illustrated with chain dotted lines, a part of the connector enclosed by dashed line is enlarged and illustrated, and in the enlarged view, the structure of the fit portion is not illustrated except for the shell.

Referring to FIG. 1 together with FIG. 4, a connector 10 according to an embodiment of the present invention is connectable to a cable 84 in which two or more wires 86 are bundled. Thus, the connector 10 of the present embodiment is a so-called cable connector. The connector 10 connected to the cable 84 forms a harness. However, the present invention is not limited thereto but can be applicable to various connectors.

Referring to FIG. 1, the connector 10 is connectable to a mating connector 80 along a front-rear direction, the mating connector 80 having a mating fit portion 82. The front-rear direction of the present embodiment is the X-direction. "Forward" means the positive X-direction. "Rearward" means the negative X-direction. Under a connected state where the connector 10 and the mating connector 80 are connected to each other, an electronic device (not shown) connected to the cable 84 is electrically connected with a mating electronic device (not shown) connected to the mating connector 80.

Figure 2:
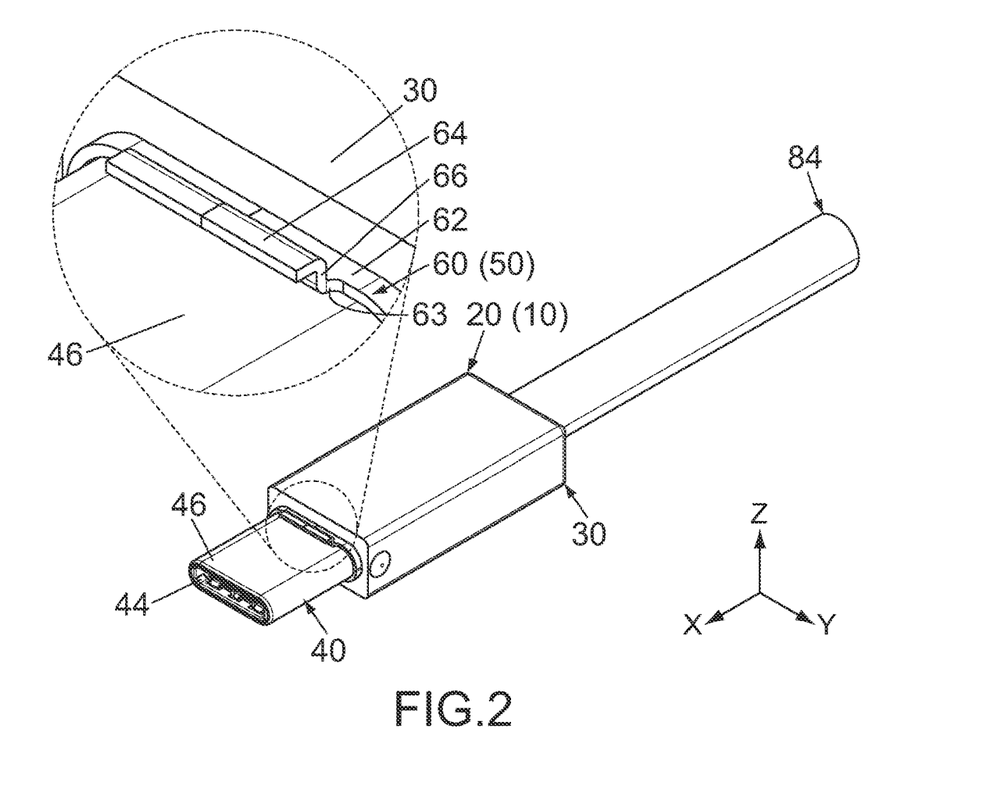
FIG. 2 is a perspective view showing an inner structure of the connector of FIG. 1, wherein a part of the inner structure enclosed by dashed line is enlarged and illustrated.

As shown in FIGS. 1 and 2, the connector 10 comprises an inner structure 20 and an outer molded body 70. The inner structure 20 of the present embodiment comprises an inner molded body 30, a fit portion 40 and a backshell 50 formed of a metal plate. Thus, the connector 10 of the present embodiment comprises the inner molded body 30, the fit portion 40, the backshell 50 and the outer molded body 70. However, the present invention is not limited thereto. For example, the backshell 50 may be provided as necessary. Instead, the connector 10 may further comprise another member in addition to the aforementioned members.

Hereafter, explanation will be made about the fit portion 40, the backshell 50, the inner molded body 30 and the outer molded body 70 of the present embodiment in this order.

Referring to FIG. 1, the fit portion 40 is located at a front end of the connector 10. The fit portion 40 projects forward from the outer molded body 70 and is mated with the mating fit portion 82 when the connector 10 is connected to the mating connector 80. The fit portion 40 of the present embodiment is received in the mating fit portion 82 under a mated state where the fit portion 40 and the mating fit portion 82 are mated with each other. Thus, the connector 10 of the present embodiment is a plug. However, the present invention is not limited thereto. For example, the connector 10 may be a receptacle.

Referring to FIG. 2, the fit portion 40 of the present embodiment comprises a plurality of terminals (not shown) each made of conductor, a housing 44 made of insulator and a shell 46 formed of a metal plate. The terminals are accommodated in the housing 44. The housing 44 holds the terminals. The shell 46 encloses the housing 44 in a perpendicular plane (YZ-plane) perpendicular to the front-rear direction. In other words, the housing 44 is covered by the shell 46 in an upper-lower direction perpendicular to the front-rear direction and is covered by the shell 46 in a lateral direction perpendicular to both the front-rear direction and the upper-lower direction. The upper-lower direction of the present embodiment is the Z-direction. "Upward" means the positive Z-direction. "Downward" means the negative Z-direction. The lateral direction of the present embodiment is the Y-direction.

The fit portion 40 of the present embodiment has the aforementioned structure. However, the structure of the fit portion 40 of the present invention is not specifically limited, provided that the fit portion 40 is mateable with the mating fit portion 82 (see FIG. 1). For example, the fit portion 40 may further comprise another member in addition to the aforementioned members. The number of the terminals (not shown) may be one.

Referring to FIGS. 2 and 4, the backshell 50 of the present embodiment is partially located rearward of the fit portion 40. In detail, the backshell 50 has a body 52 and a projecting portion 60. The projecting portion 60 is located at a front end of the backshell 50 and is fixed to a rear end portion of the shell 46 of the fit portion 40. The body 52 extends rearward from the fit portion 40. The body 52 of the present embodiment is a box-like portion which roughly has a rectangular parallelepiped shape. The backshell 50 of the present embodiment has the aforementioned structure. However, the structure of the backshell 50 of the present invention is not specifically limited.

Referring to FIG. 4, the cable 84 is fixed to the body 52 of the backshell 50. The wires 86 of the cable 84 extend forward through the inside of the body 52 and are connected to the terminals (not shown) of the fit portion 40, respectively. The terminals are brought into contact with mating terminals (not shown) of the mating connector 80 (see FIG. 1), respectively, under the mated state.

Referring to FIGS. 2 and 4, the inner molded body 30 of the present embodiment is molded of resin. The inner molded body 30 has an outline of a rectangular parallelepiped shape. The inner molded body 30 continuously extends along the front-rear direction and covers a rear end portion of the fit portion 40 in the YZ-plane. The thus-covered fit portion 40 projects forward from the inner molded body 30. When the inner structure 20 is seen from the front, the fit portion 40 is located at a middle part of the inner molded body 30 in the YZ-plane.

The inner molded body 30 of the present embodiment covers the body 52 of the backshell 50 in the YZ-plane. The body 52 is entirely embedded in the inner molded body 30. In contrast, the projecting portion 60 of the backshell 50 is located outside the inner molded body 30. Thus, the backshell 50 is partially located in the inner molded body 30.

The inner molded body 30 of the present embodiment has the aforementioned structure. However, the present invention is not limited thereto, but the structure of the inner molded body 30 can be modified as necessary. For example, the inner molded body 30 may partially cover the body 52 of the backshell 50 in the YZ-plane. In other words, the body 52 may partially exposed outward from the inner molded body 30.

Referring to FIG. 1, the outer molded body 70 of the present embodiment is molded of resin. Referring to FIG. 1 together with FIG. 2, the outer molded body 70 is formed so that the inner molded body 30 is entirely embedded therein. The outer molded body 70 continuously extends along the front-rear direction.

Referring to FIG. 4, the outer molded body 70 of the present embodiment has a rear portion (thin portion) 72, a front portion (thick portion) 74 and a cable protector 78. The rear portion 72 is located between a front end and a rear end of the inner molded body 30 in the front-rear direction. The rear portion 72 covers the inner molded body 30 in the YZ-plane. The front portion 74 extends forward from the rear portion 72. The front portion 74 covers the rear end portion of the fit portion 40 in the YZ-plane. However, the most part of the fit portion 40 is located outside the outer molded body 70. Thus, the front portion 74 partially covers the fit portion 40 in the YZ-plane. The cable protector 78 extends rearward from the rear portion 72. The cable protector 78 covers a front part of the cable 84 in the YZ-plane to protect the cable 84.

Figure 3:
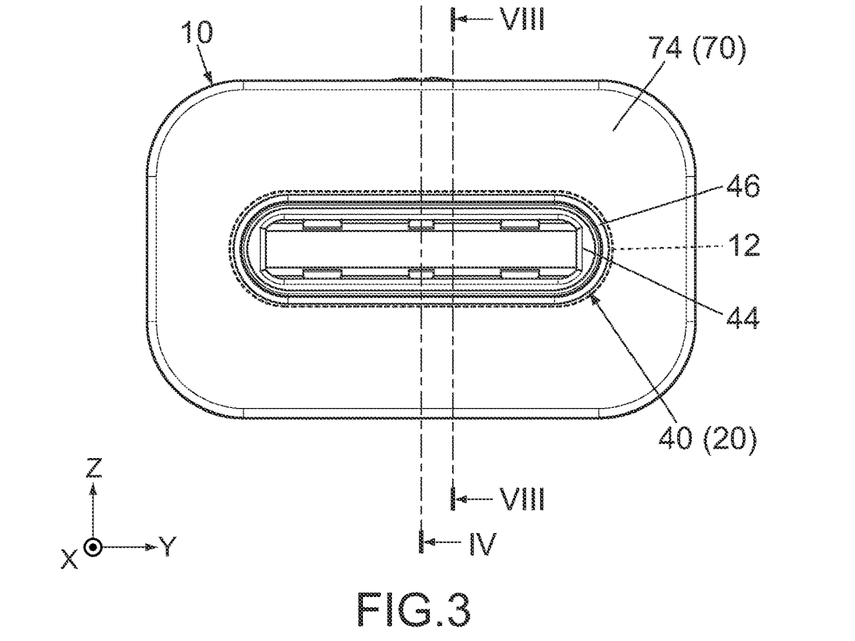
FIG. 3 is a front view showing the connector of FIG. 1, wherein a position of a boundary is illustrated with dashed line.

Referring to FIG. 4 together with FIG. 1, the rear portion 72 and the front portion 74 of the outer molded body 70 have an outline of a rectangular parallelepiped shape. Each of two parts of the front portion 74 which are located over and under the fit portion 40 has a first vertical size (thickness) in the upper-lower direction. Each of two parts of the rear portion 72 which are located over and under the inner molded body 30 has a second vertical size (thickness) in the upper-lower direction. The first vertical size is larger than the second vertical size. In addition, each of two parts of the front portion 74 which are located on opposite sides of the fit portion 40 in the lateral direction has a first lateral size (thickness) in the lateral direction. Each of two parts of the rear portion 72 which are located on opposite sides of the inner molded body 30 in the lateral direction has a second lateral size (thickness) in the lateral direction. The first lateral size is larger than the second lateral size. In other words, the front portion 74 is thicker than the rear portion 72 in the YZ-plane. Referring to FIG. 3, when the connector 10 is seen from the front, the fit portion 40 is located at a middle part of the outer molded body 70 in the YZ-plane. In other words, the fit portion 40 projects forward from the middle part of the outer molded body 70 in the YZ-plane.

The outer molded body 70 of the present embodiment has the aforementioned structure. However, the present invention is not limited thereto, but the structure of the outer molded body 70 can be modified as necessary. For example, the fit portion 40 may project forward from a lower part of the outer molded body 70.

Hereafter, explanation will be made about the projecting portion 60 of the present embodiment.

Referring to FIGS. 2 and 4, the projecting portion 60 of the present embodiment is a part of the backshell 50. Thus, the inner structure 20 of the present embodiment comprises the projecting portion 60 which is formed integrally with the backshell 50. The projecting portion 60 projects forward from the inner molded body 30. The projecting portion 60 has a peripheral portion 62, two first portions 64 and two second portions 66.

The peripheral portion 62 encloses the shell 46 of the fit portion 40 in the YZ-plane. In other words, the peripheral portion 62 is located on an outer circumference of the fit portion 40 in the YZ-plane. The peripheral portion 62 is in contact all around with the shell 46. The peripheral portion 62 has two protruding portions 63. One of the protruding portions 63 is formed on an upper portion of the peripheral portion 62 which is located on an upper surface of the shell 46. A remaining one of the protruding portions 63 is formed on a lower portion of the peripheral portion 62 which is located on a lower surface of the shell 46. Each of the protruding portions 63 is located at a front end of a middle part of the peripheral portion 62, the middle part being located at the middle of the peripheral portion 62 in the lateral direction. Each of the protruding portions 63 protrudes forward.

The two second portions 66 correspond to the two protruding portions 63, respectively. Each of the second portions 66 of the present embodiment extends along the upper-lower direction from a front end of the corresponding protruding portion 63 so as to be away from the fit portion 40. More specifically, each of the second portions 66 of the present embodiment has a rectangular flat-plate shape and extends in parallel to the YZ-plane. However, the present invention is not limited thereto. For example, each of the second portions 66 may extend from the front end of the corresponding protruding portion 63 along a direction oblique to the upper-lower direction. Thus, each of the second portions 66 may extend in the upper-lower direction so as to be away from the fit portion 40.

The two first portions 64 correspond to the two second portions 66, respectively. Each of the first portions 64 of the present embodiment extends forward from an end (upper or lower end) of the corresponding second portion 66 along the front-rear direction perpendicular to the upper-lower direction. More specifically, each of the first portions 64 of the present embodiment has a rectangular flat-plate shape and extends in parallel to a horizontal plane (XY-plane). However, the present invention is not limited thereto. For example, each of the first portions 64 may extend from the end of the corresponding second portion 66 along a direction oblique to the upper-lower direction. Thus, each of the first portions 64 may extend in a direction intersecting with the upper-lower direction.

Each of the first portions 64 and the corresponding second portion 66 of the present embodiment form the aforementioned structure which has an L-like shape in the XZ-plane. These L-like shaped two parts of the projecting portion 60 are located above and below the fit portion 40, respectively. Thus, at least a part of the projecting portion 60 is located outward of the fit portion 40 in the upper-lower direction. Moreover, at least a part of the projecting portion 60 is apart from the fit portion 40 in the upper-lower direction. As described above, at least a part of the projecting portion 60 is apart from the fit portion 40 and is located outward of the fit portion 40 in a predetermined direction perpendicular to the front-rear direction. This predetermined direction is defined as the upper-lower direction in the present embodiment and modifications described later.

The projecting portion 60 of the present embodiment is entirely covered by the front portion 74 when the outer molded body 70 is formed. The thus-covered projecting portion 60 is entirely embedded in the front portion 74. However, the present invention is not limited thereto. For example, the projecting portion 60 may be partially exposed outward from the outer molded body 70. Thus, the projecting portion 60 may be, at least in part, embedded in the front portion 74.

As previously described, the outer molded body 70 of the present embodiment is molded to cover the inner structure 20. More specifically, the outer molded body 70 is formed by cooling and hardening liquid resin which is put in a die. Referring to FIG. 4 together with FIG. 3, when the resin is cooled with no provision of the projecting portion 60 of the present embodiment, a boundary 12 located between the fit portion 40 and the outer molded body 70 tends to be formed with a gap (not shown). According to a study of the inventor of the present invention, the gap of the boundary 12 is formed by the process described below.

The resin which is put around the inner molded body 30 (hereafter, referred to as "thin resin") is thinner than the resin which is put around the fit portion 40 (hereafter, referred to as "thick resin") in the YZ-plane. The thin resin is rapidly cooled and hardened in comparison with the thick resin. When the thin resin is cooled and hardened, the thin resin shrinks to form the rear portion 72. The thick resin is moved toward the rear portion 72 so as to be away from the fit portion 40 in accordance with the shrinking of the thin resin if the projecting portion 60 of the present embodiment is not provided. As a result, the boundary 12 tends to be formed with a gap (not shown). This gap is relatively easily formed because the thick resin covers the shell 46 which is made of metal material different from the resin.

However, the projecting portion 60 of the present embodiment is located within the thick resin when the outer molded body 70 is molded and thereby blocks the movement of the thick resin toward the rear portion 72. As a result, the thick resin shrinks and is hardened without being apart from the fit portion 40. Thus, the boundary 12 between the fit portion 40 and the outer molded body 70 is prevented from being formed with a gap. As can be seen from the explanation described above, the present embodiment provides the connector 10 which is configured so that the boundary 12 between the fit portion 40 and the outer molded body 70 is not formed with a gap.

As described above, the projecting portion 60 of the present embodiment prevents the movement of the resin from a part corresponding to the front portion 74 toward another part corresponding to the rear portion 72 during molding of the resin. In other words, the projecting portion 60 of the present embodiment has a block function which prevents the movement of the resin.

According to the present embodiment, the connector 10 is formed with a heat-transfer path which extends from the projecting portion 60 made of metal to the outside of the outer molded body 70 through the shell 46 made of metal. In other words, the projecting portion 60 of the present embodiment is connected to the heat-transfer path which extends to a part located outward of the outer molded body 70 and thereby works as a heat sink. More specifically, the projecting portion 60 has a cooling function to accelerate cooling of the thick resin. The thick resin is cooled at a rate substantially same as that of the thin resin by the cooling function of the projecting portion 60, and thereby the movement of the thick resin toward the rear portion 72 is reduced.

Summarizing the explanation described above, the projecting portion 60 of the present embodiment has two functions which are the block function and the cooling function. However, the present invention is not limited thereto. For example, the projecting portion 60 should have at least one of the block function and the cooling function. More specifically, the projecting portion 60 should have at least one of two structure, one of which is a structure suitable to prevent the movement of the resin, and a remaining one of which is a structure connected to the heat-transfer path extending outward from the outer molded body 70.

Each of the first portions 64 of the projecting portion 60 of the present embodiment vertically divides the thick resin into two parts. As a result, the cooling of each of the two parts of the thick resin is accelerated, and the thick resin is further reliably prevented from being moved to be away from the fit portion 40. However, the present invention is not limited thereto, but the structure of the projecting portion 60 can be variously modified.

The projecting portion 60 of the present embodiment is provided on the backshell 50 and projects from the inner molded body 30. However, the present invention is not limited thereto. For example, the projecting portion 60 may be a member which is formed separately from the backshell 50. The thus-formed projecting portion 60 may be fixed to the backshell 50. Instead, the thus-formed projecting portion 60 may be fixed to the shell 46 of the fit portion 40 and may project from the fit portion 40. Thus, the projecting portion 60 should project from the fit portion 40 or the inner molded body 30.

The projecting portion 60 of the present embodiment has the peripheral portion 62 in addition to the first portions 64 and the second portions 66. However, the present invention is not limited thereto. For example, the projecting portion 60 may have only the first portions 64 and the second portions 66. In this instance, each of the second portions 66 may extend in the upper-lower direction after extending forward from the inner molded body 30. Each of the first portions 64 and the second portions 66 may have a stick-like shape instead of the flat-plate shape.

The fit portion 40 of the present embodiment has a wide structure. In detail, the fit portion 40 has a size in the lateral direction which is larger than another size thereof in the upper-lower direction. As previously described, each of the two parts of the front portion 74 which are located over and under the fit portion 40 has the first vertical size in the upper-lower direction. Each of the two parts of the front portion 74 which are located on opposite sides of the fit portion 40 in the lateral direction has the first lateral size in the lateral direction. According to the aforementioned wide structure, the first vertical size tends to be larger than the first lateral size. As a result, a gap is relatively easily formed at a part of the boundary 12 which is located between the fit portion 40 and the outer molded body 70 in the upper-lower direction. A gap is particularly easily formed at a middle part of the boundary 12 in the lateral direction. However, each of the first portions 64 and the corresponding second portions 66 of the projecting portion 60 of the present embodiment are located at this middle part of the fit portion 40 in the lateral direction. Thus, at least a part of the projecting portion 60 is located at the middle part of the fit portion 40 in the lateral direction. This structure effectively prevents the formation of a gap at the boundary 12.

The first portions 64 and the second portions 66 of the projecting portion 60 of the present embodiment are located both above and below the fit portion 40. This structure further effectively prevents the formation of a gap at the boundary 12. However, the present invention is not limited thereto. For example, when the projecting portion 60 projects from a lower part of the outer molded body 70, the first portion 64 and the second portion 66 may be located only above the fit portion 40. The first portions 64 and the second portions 66 may be located at opposite sides of the fit portion 40 in the lateral direction in addition to above and below the fit portion 40. The first portions 64 and the second portions 66 may enclose all around the fit portion 40 in the YZ-plane.

A large number of the first portions 64 and the second portions 66 may be arranged in the YZ-plane with a distance formed therebetween.

Each of the inner molded body 30 and the outer molded body 70 of the present embodiment has a rectangular shape in the YZ-plane. In contrast, the fit portion 40 of the present embodiment has a track-like shape in the YZ-plane. However, the present invention is not limited thereto, but the shape of each member in the YZ-plane is not specifically limited, provided that the fit portion 40 is located inward of the inner molded body 30 in the YZ-plane and the inner molded body 30 is located inward of the outer molded body 70 in the YZ-plane. For example, each of the fit portion 40, the inner molded body 30 and the outer molded body 70 may have a circular shape in the YZ-plane.

The connector 10 of the present embodiment can be further variously modified in addition to the already described various modifications. In particular, the projecting portion 60 can be modified into various shapes, provided that it can change a movement direction of the thick resin to prevent the formation of a gap when the thick resin shrinks. Hereafter, explanation will be made about modifications of the projecting portion 60 and will be mainly about a structure different from that of the projecting portion 60.

Figure 5:
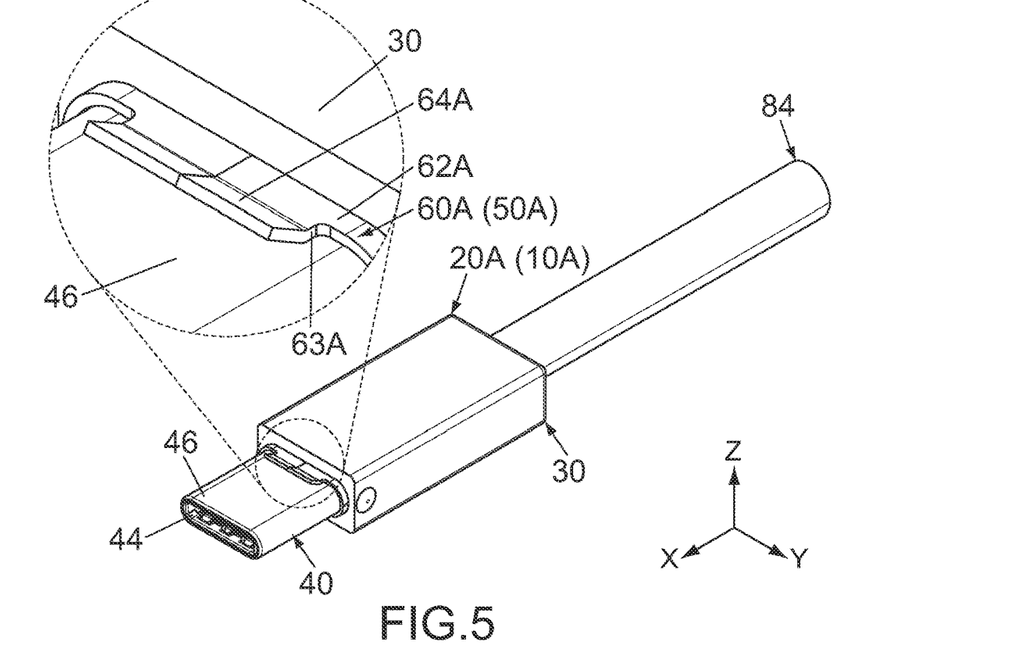
FIG. 5 is a perspective view showing a first modification of the inner structure of FIG. 2, wherein a part of the inner structure enclosed by dashed line is enlarged and illustrated.
Figure 6:
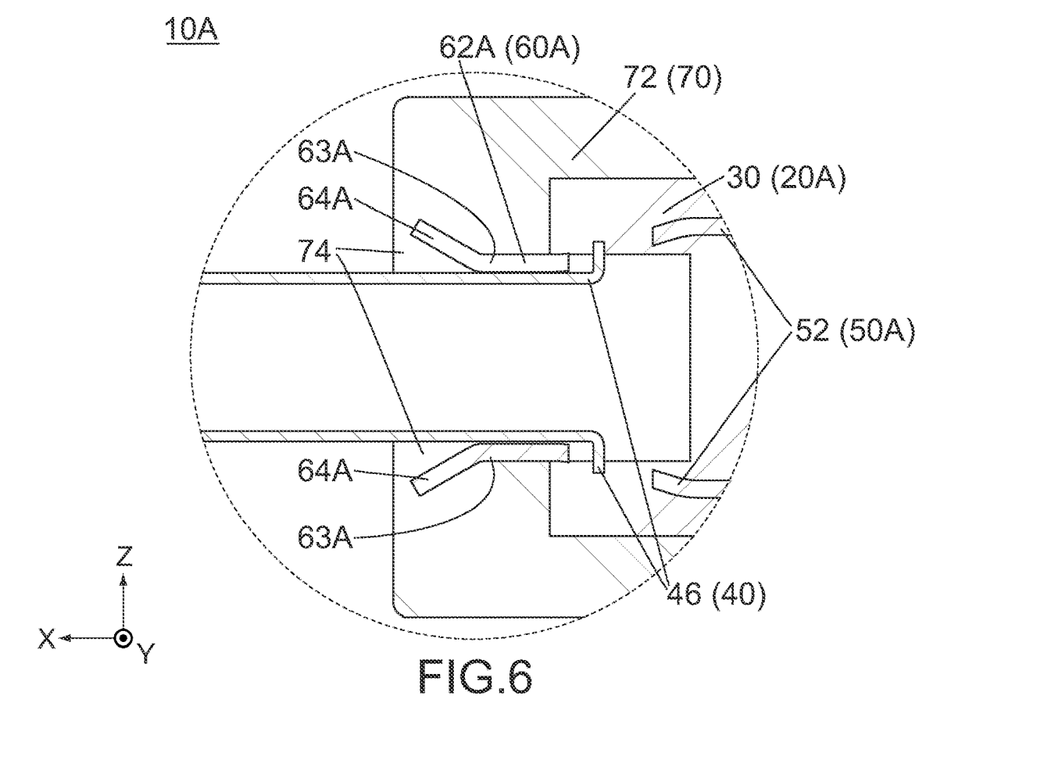
FIG. 6 is a partial, cross-sectional view showing a first modification of the connector of FIG. 3, taken along line IV-IV, wherein the connector comprises the inner structure of FIG. 5, and the structure of the fit portion is not illustrated except for the shell.

Comparing FIGS. 5 and 6 with FIGS. 2 and 4, a connector 10A according to a first modification comprises an inner structure 20A which is different from the inner structure 20 of the connector 10. The inner structure 20A comprises a backshell 50A which is different from the backshell 50 of the inner structure 20. The backshell 50A has a projecting portion 60A which is different from the projecting portion 60. Thus, the inner structure 20A comprises the projecting portion 60A. The connector 10A has a structure similar to that of the connector 10 except for the aforementioned differences and works similarly to the connector 10.

Referring to FIGS. 5 and 6, the projecting portion 60A of the present modification is a part of the backshell 50A. The projecting portion 60A projects forward from the inner molded body 30. The projecting portion 60A has a peripheral portion 62A and two first portions 64A. The peripheral portion 62A encloses the shell 46 of the fit portion 40 in the YZ-plane. The peripheral portion 62A has two protruding portions 63A. The protruding portions 63A are formed on upper and lower portions of the peripheral portion 62A, respectively. Each of the protruding portions 63A is located at a front end of a middle part of the peripheral portion 62A, the middle part being located at the middle of the peripheral portion 62A in the lateral direction. Each of the protruding portions 63A protrudes forward.

The two first portions 64A correspond to the two protruding portions 63A, respectively. Each of the first portions 64A has a rectangular flat-plate shape. Each of the first portions 64A of the present modification divides the front portion 74 into two parts in the upper-lower direction. More specifically, each of the first portions 64A extends forward from a front end of the corresponding protruding portion 63A along a direction oblique to the upper-lower direction while being away from the fit portion 40. However, the present invention is not limited thereto, but each of the first portions 64A may extend in a direction intersecting with the upper-lower direction.

Each of the first portions 64A of the present modification is located above or below the fit portion 40. Thus, at least a part of the projecting portion 60A is located outward of the fit portion 40 in the upper-lower direction. The projecting portion 60A of the present modification is, at least in part, embedded in the front portion 74 of the outer molded body 70. The present modification provides the connector 10A which is configured so that the boundary 12 (see FIG. 3) between the fit portion 40 and the outer molded body 70 is not formed with a gap.

Figure 7:
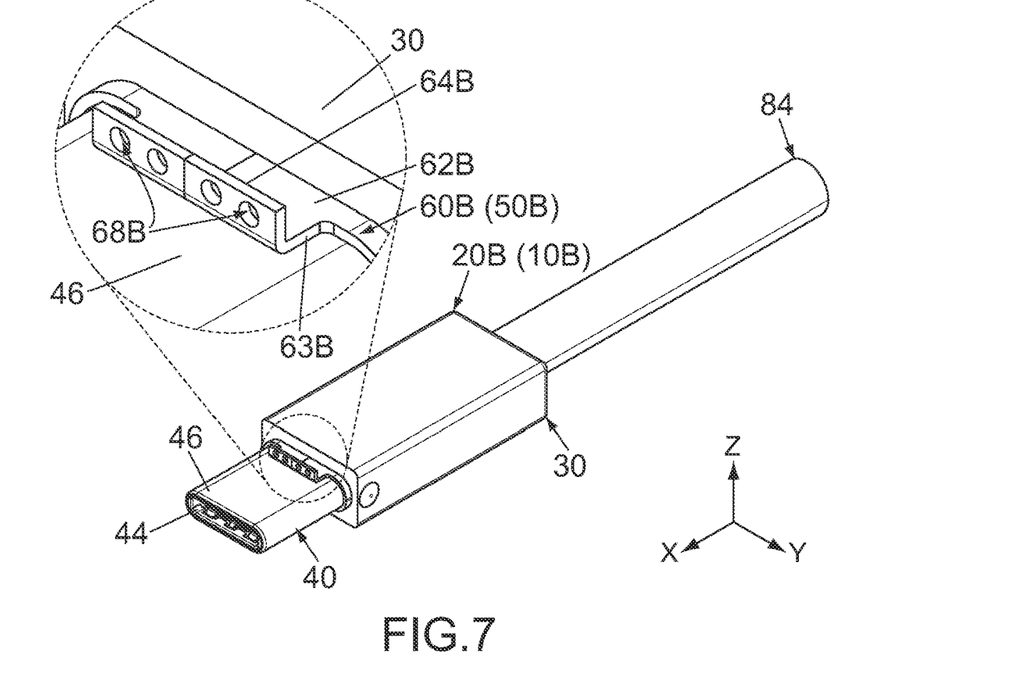
FIG. 7 is a perspective view showing a second modification of the inner structure of FIG. 2, wherein a part of the inner structure enclosed by dashed line is enlarged and illustrated.
Figure 8:
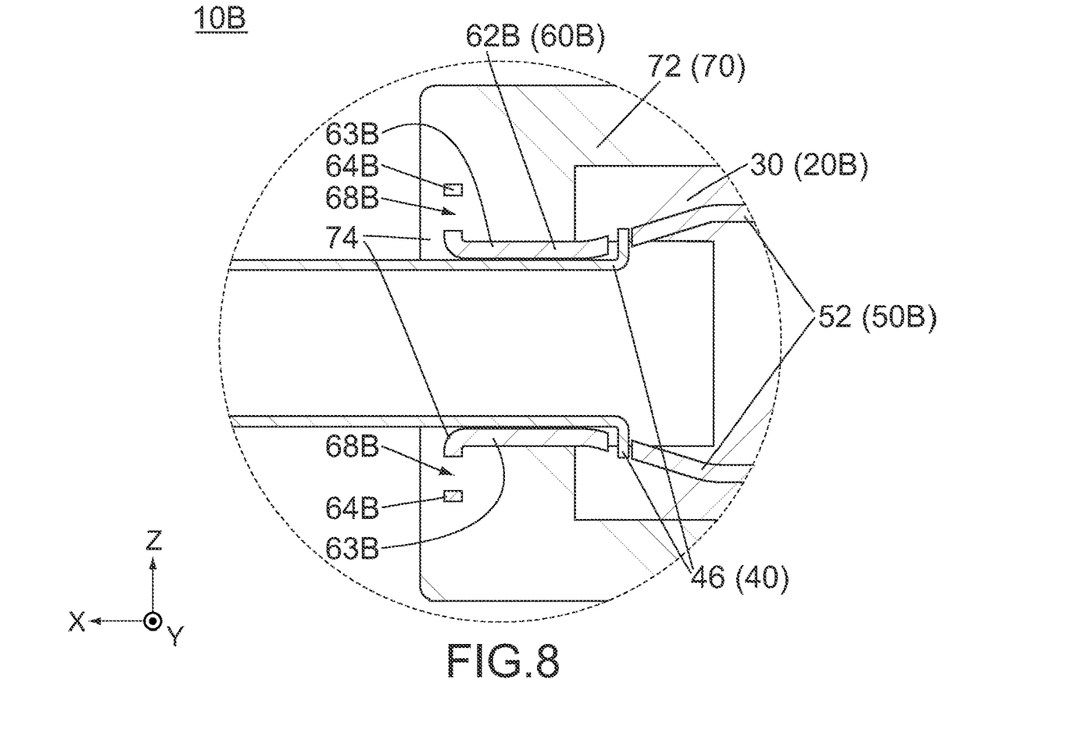
FIG. 8 is a partial, cross-sectional view showing a second modification of the connector of FIG. 3, taken along line VIII-VIII, wherein the connector comprises the inner structure of FIG. 7, and the structure of the fit portion is not illustrated except for the shell.

Comparing FIGS. 7 and 8 with FIGS. 2 and 4, a connector 10B according to a second modification comprises an inner structure 20B which is different from the inner structure 20 of the connector 10. The inner structure 20B comprises a backshell 50B which is different from the backshell 50 of the inner structure 20. The backshell 50B has a projecting portion 60B which is different from the projecting portion 60. Thus, the inner structure 20B comprises the projecting portion 60B. The connector 10B has a structure similar to that of the connector 10 except for the aforementioned differences and works similarly to the connector 10.

Referring to FIGS. 7 and 8, the projecting portion 60B of the present modification is a part of the backshell 50B. The projecting portion 60B projects forward from the inner molded body 30. The projecting portion 60B has a peripheral portion 62B and two first portions 64B. The peripheral portion 62B encloses the shell 46 of the fit portion 40 in the YZ-plane. The peripheral portion 62B has two protruding portions 63B. The protruding portions 63B are formed on upper and lower portions of the peripheral portion 62B, respectively. Each of the protruding portions 63B is located at a front end of a middle part of the peripheral portion 62B, the middle part being located at the middle of the peripheral portion 62B in the lateral direction. Each of the protruding portions 63B protrudes forward.

The two first portions 64B correspond to the two protruding portions 63B, respectively. Each of the first portions 64B has a rectangular flat-plate shape. Each of the first portions 64B of the present modification extends from a front end of the corresponding protruding portion 63B along the upper-lower direction perpendicular to the front-rear direction while being away from the fit portion 40. However, the present invention is not limited thereto, but each of the first portions 64B may extend in a direction intersecting with the front-rear direction.

Each of the first portions 64B is formed with four hole portions 68B. The hole portions 68B are arranged in the lateral direction. Each of the hole portions 68B is a hole which passes through the first portion 64B in the front-rear direction. Each of the first portions 64B of the present modification has the aforementioned structure. Each of the first portions 64B divides the front portion 74 into two parts in the front-rear direction, and a plurality of the hole portions 68B divides the front portion 74 into two parts in the upper-lower direction. However, the present invention is not limited thereto. For example, each of the first portions 64B may be formed with one of the hole portions 68B which extends long in the lateral direction.

Each of the first portions 64B of the present modification is located above or below the fit portion 40. Thus, at least a part of the projecting portion 60B is located outward of the fit portion 40 in the upper-lower direction. The projecting portion 60B of the present modification is, at least in part, embedded in the front portion 74 of the outer molded body 70. The present modification provides the connector 10B which is configured so that the boundary 12 (see FIG. 3) between the fit portion 40 and the outer molded body 70 is not formed with a gap.

Figure 9:
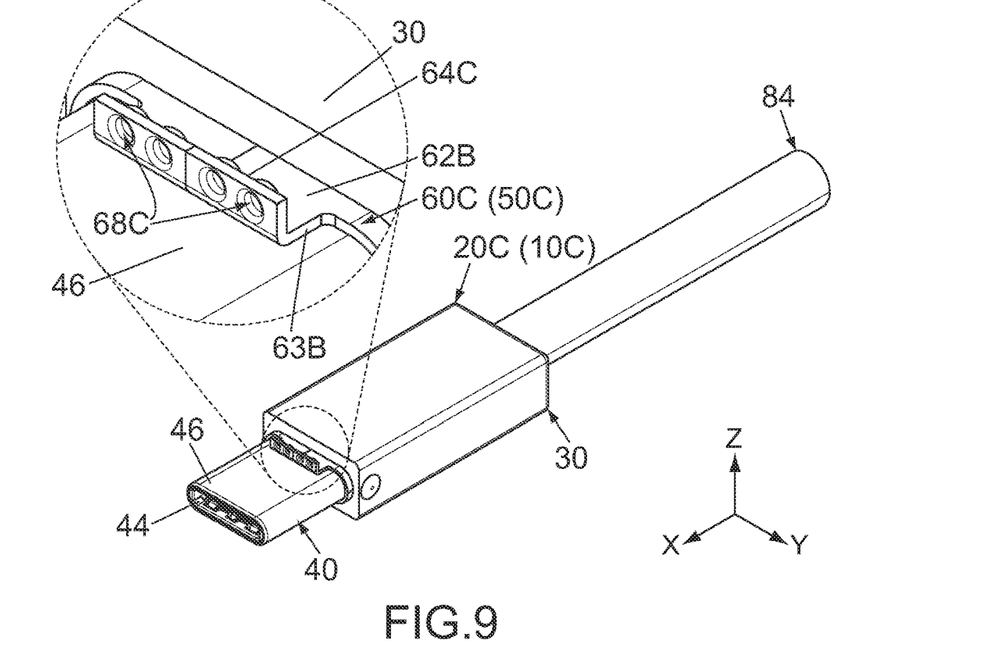
FIG. 9 is a perspective view showing a third modification of the inner structure of FIG. 2, wherein a part of the inner structure enclosed by dashed line is enlarged and illustrated.
Figure 10:
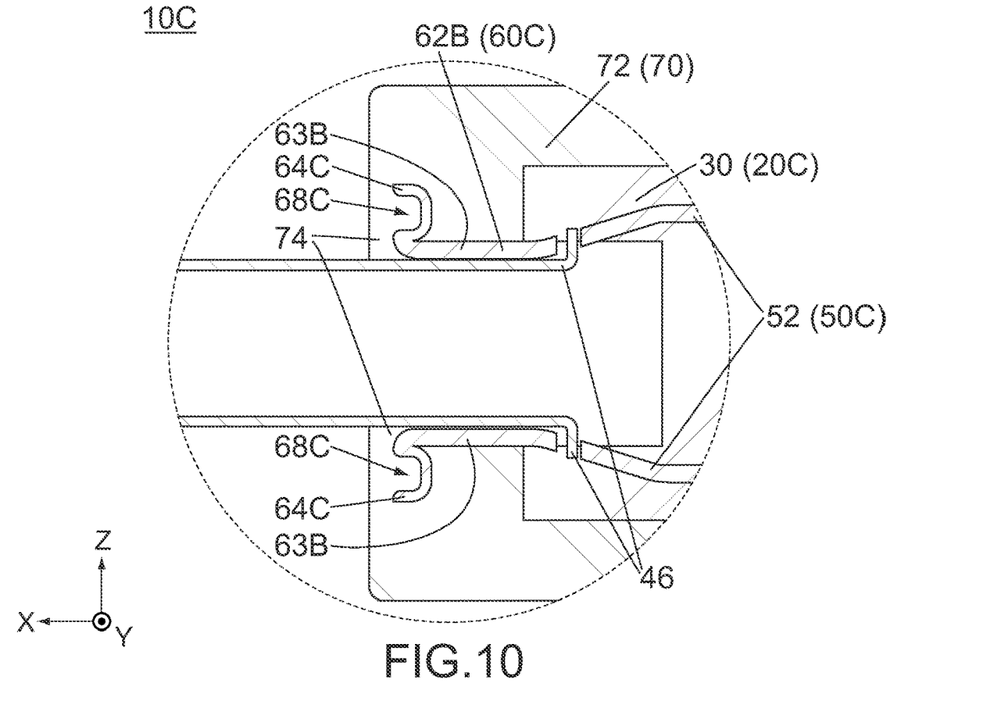
FIG. 10 is a partial, cross-sectional view showing a third modification of the connector of FIG. 3, taken along line VIII-VIII, wherein the connector comprises the inner structure of FIG. 9, and the structure of the fit portion is not illustrated except for the shell.

Comparing FIGS. 9 and 10 with FIGS. 7 and 8, a connector 10C according to a third modification comprises an inner structure 20C which is different from the inner structure 20B of the connector 10B. The inner structure 20C comprises a backshell 50C which is different from the backshell 50B of the inner structure 20B. The backshell 50C has a projecting portion 60C which is different from the projecting portion 60B. Thus, the inner structure 20C comprises the projecting portion 60C. The projecting portion 60C has the peripheral portion 62B same as that of the projecting portion 60B. However, the projecting portion 60C has two first portions 64C which are different from the first portions 64B of the projecting portion 60B. The connector 10C has a structure similar to that of the connector 10B except for the aforementioned differences and works similarly to the connector 10B.

Referring to FIGS. 9 and 10, the projecting portion 60C of the present modification is a part of the backshell 50C. The projecting portion 60C projects forward from the inner molded body 30. The two first portions 64C correspond to the two protruding portions 63B, respectively. Each of the first portions 64C has a rectangular flat-plate shape. Each of the first portions 64C extends from a front end of the corresponding protruding portion 63B in a direction intersecting with the front-rear direction while being away from the fit portion 40.

Each of the first portions 64C is formed with four hole portions 68C. The hole portions 68C are arranged in the lateral direction. Each of the hole portions 68C of the present modification is formed by recessing a part of the first portion 64C rearward. In other words, each of the hole portions 68C of the present modification is a hole with a bottom. However, the present invention is not limited thereto. For example, the structure of each of the first portions 64C can be modified similarly to the first portion 64B (see FIGS. 7 and 8).

Each of the first portions 64C of the present modification is located above or below the fit portion 40. Thus, at least a part of the projecting portion 60C is located outward of the fit portion 40 in the upper-lower direction. The projecting portion 60C of the present modification is, at least in part, embedded in the front portion 74 of the outer molded body 70. The present modification provides the connector 10C which is configured so that the boundary 12 (see FIG. 3) between the fit portion 40 and the outer molded body 70 is not formed with a gap.

Figure 11:
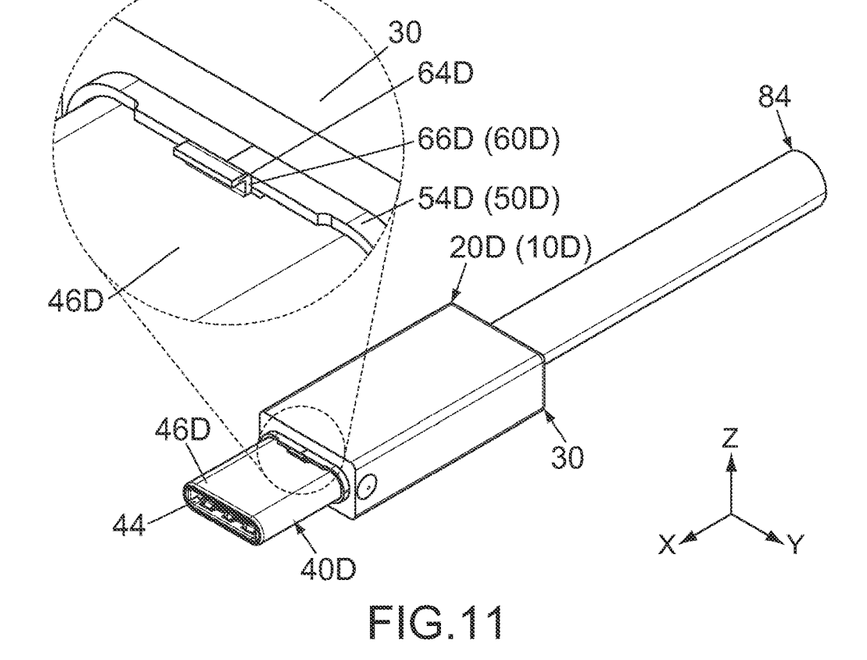
FIG. 11 is a perspective view showing a fourth modification of the inner structure of FIG. 2, wherein a part of the inner structure enclosed by dashed line is enlarged and illustrated.
Figure 12:
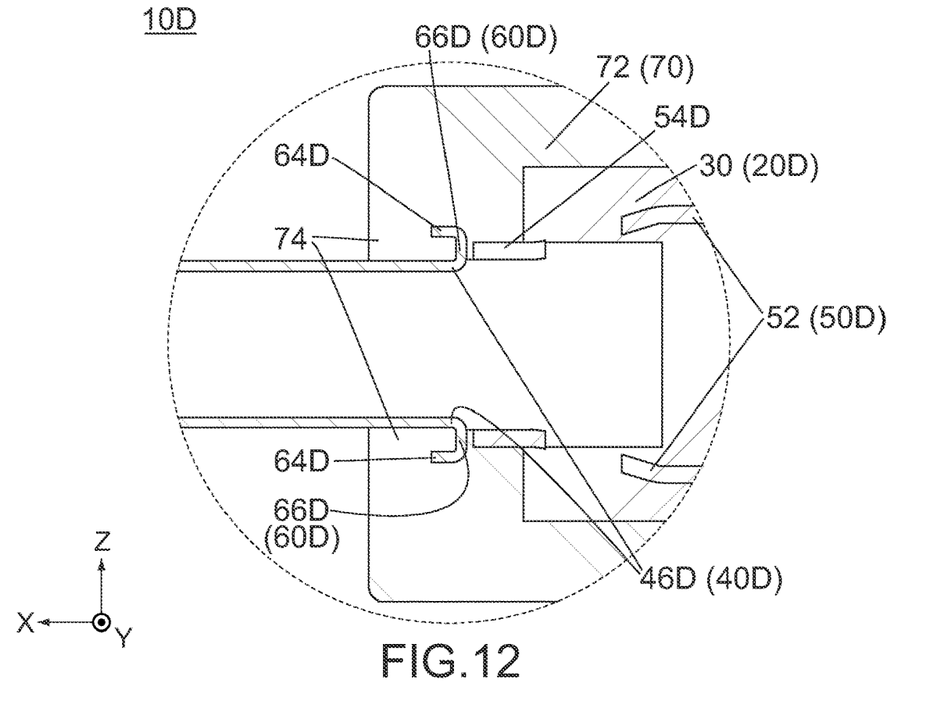
FIG. 12 is a partial, cross-sectional view showing a fourth modification of the connector of FIG. 3, taken along line IV-IV, wherein the connector comprises the inner structure of FIG. 11, and the structure of the fit portion is not illustrated except for the shell.

Comparing FIGS. 11 and 12 with FIGS. 2 and 4, a connector 10D according to a fourth modification comprises an inner structure 20D which is different from the inner structure 20 of the connector 10. The inner structure 20D comprises a fit portion 40D, a backshell 50D and projecting portions 60D which are different from the fit portion 40, the backshell 50 and the projecting portion 60, respectively. The fit portion 40D comprises a shell 46D which is different from the shell 46. The backshell 50D has a peripheral portion 54D instead of the projecting portion 60. The peripheral portion 54D encloses the shell 46D of the fit portion 40D in the YZ-plane similarly to the peripheral portion 62. The connector 10D has a structure similar to that of the connector 10 except for the aforementioned differences and works similarly to the connector 10.

Referring to FIGS. 11 and 12, the inner structure 20D of the present modification comprises two of the projecting portions 60D. Each of the projecting portions 60D of the present modification is provided on the shell 46D. More specifically, each of the projecting portions 60D is a part of a metal plate which forms the shell 46D and is connected to the shell 46D. However, the present invention is not limited thereto. For example, each of the projecting portions 60D may be a member which is formed separately from the shell 46D and may be fixed to the shell 46D.

Each of the projecting portions 60D of the present modification projects from the fit portion 40D in the upper-lower direction. Each of the projecting portions 60D has a first portion 64D and a second portion 66D. Each of the first portions 64D and the second portions 66D has a rectangular flat-plate shape. Each of the second portions 66D extends along the upper-lower direction while being away from the fit portion 40D. Each of the first portions 64D extends forward from an end (upper or lower end) of the second portion 66D. Thus, each of the first portion 64D and the corresponding second portion 66D of the present modification forms a structure which has an L-like shape in the XZ-plane.

Each of the first portions 64D of the present modification is located above or below the fit portion 40D. Thus, at least a part of each of the projecting portions 60D is located outward of the fit portion 40D in the upper-lower direction. The projecting portions 60D of the present modification are, at least in part, embedded in the front portion 74 of the outer molded body 70. The present modification provides the connector 10D which is configured so that the boundary 12 (see FIG. 3) between the fit portion 40D and the outer molded body 70 is not formed with a gap.

Figure 13:
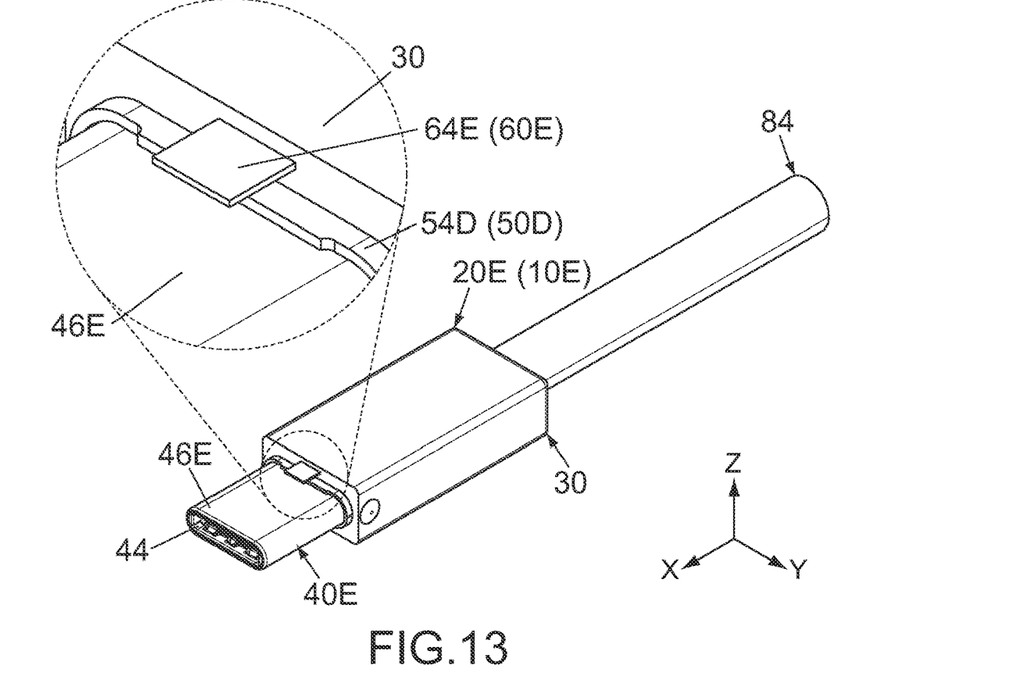
FIG. 13 is a perspective view showing a fifth modification of the inner structure of FIG. 2, wherein a part of the inner structure enclosed by dashed line is enlarged and illustrated.
Figure 14:
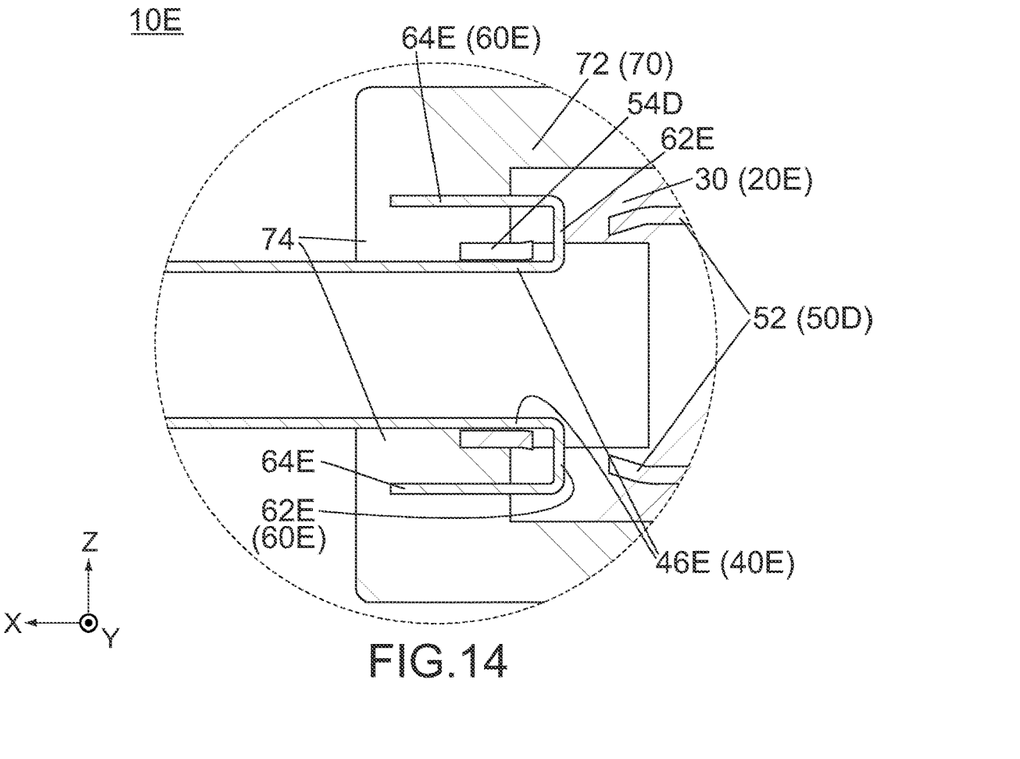
FIG. 14 is a partial, cross-sectional view showing a fifth modification of the connector of FIG. 3, taken along line IV-IV, wherein the connector comprises the inner structure of FIG. 13, and the structure of the fit portion is not illustrated except for the shell.

Comparing FIGS. 13 and 14 with FIGS. 11 and 12, a connector 10E according to a fifth modification comprises an inner structure 20E which is different from the inner structure 20D of the connector 10D. The inner structure 20E comprises a fit portion 40E and projecting portions 60E which are different from the fit portion 40D and the projecting portions 60D, respectively. The fit portion 40E comprises a shell 46E which is different from the shell 46D. The connector 10E has a structure similar to that of the connector 10D except for the aforementioned differences and works similarly to the connector 10D.

Referring to FIGS. 13 and 14, the inner structure 20E of the present modification comprises two of the projecting portions 60E. Each of the projecting portions 60E of the present modification is connected to the shell 46E and projects from the fit portion 40E in the upper-lower direction. Each of the projecting portions 60E has a coupling portion 62E and a first portion 64E. Each of the coupling portions 62E and the first portions 64E has a rectangular flat-plate shape. Each of the coupling portions 62E extends in the inner molded body 30 along the upper-lower direction while being away from the fit portion 40E. Each of the first portions 64E extends in the inner molded body 30 from an end (upper or lower end) of the coupling portion 62E and thereafter projects outward from the inner molded body 30.

Each of the first portions 64E of the present modification is located above or below the fit portion 40E. Thus, at least a part of each of the projecting portions 60E is located outward of the fit portion 40E in the upper-lower direction. The projecting portions 60E of the present modification are, at least in part, embedded in the front portion 74 of the outer molded body 70. The present modification provides the connector 10E which is configured so that the boundary 12 (see FIG. 3) between the fit portion 40E and the outer molded body 70 is not formed with a gap.

The aforementioned embodiment and modifications can be further variously modified and can be variously combined to each other. For example, the projecting portion may be a part of a member other than the shell and the backshell.

What is claimed is:

1. A connector connectable to a mating connector along a front-rear direction, the mating connector having a mating fit portion, wherein:

the connector comprises an inner structure and an outer molded body;

the inner structure comprises an inner molded body, a fit portion, a projecting portion, and a backshell formed of a single metal plate;

the fit portion projects forward from the inner molded body and is mated with the mating fit portion when the connector is connected to the mating connector;

the projecting portion projects from the fit portion or the inner molded body;

at least a part of the projecting portion is located outward of the fit portion in an upper-lower direction perpendicular to the front-rear direction;

the outer molded body has a rear portion and a front portion;

the rear portion covers the inner molded body in a perpendicular plane perpendicular to the front-rear direction;

the front portion extends forward from the rear portion and partially covers the fit portion in the perpendicular plane; and the projecting portion is, at least in part, embedded in the front portion, wherein:

the projecting portion is a part of the backshell; and the backshell is partially located rearward of the fit portion and is partially located in the inner molded body.

2. The connector as recited in claim 1, wherein:

the outer molded body is molded of resin; and the projecting portion prevents a movement of the resin from a part corresponding to the front portion toward another part corresponding to the rear portion when the resin is cast.

3. The connector as recited in claim 1, wherein the projecting portion is connected to a heat-transfer path which extends to a portion located outward of the outer molded body.

4. The connector as recited in claim 1, wherein:

the projecting portion has a first portion; and the first portion extends in a direction intersecting with the upper-lower direction.

5. The connector as recited in claim 1, wherein:

the projecting portion has a first portion;

the first portion extends in a direction intersecting with the front-rear direction; and the first portion is formed with a hole portion.

6. The connector as recited in claim 1, wherein:

the fit portion has a size in a lateral direction perpendicular to both the front-rear direction and the upper-lower direction which is larger than another size thereof in the upper-lower direction; and at least a part of the projecting portion is located at a middle part of the fit portion in the lateral direction.

7. The connector as recited in claim 4, wherein:

the projecting portion has a second portion;

the second portion extends in the upper-lower direction so as to be away from the fit portion; and the first portion extends from an end of the second portion.

* * * * *